Patented Feb. 11, 1936

2,030,835

UNITED STATES PATENT OFFICE 2,030,835

PREPARATION OF ESTERS

Henry L. Cox, South Charleston, and Paul S. Greer, Charleston, W. Va., assignors, by mesne assignments, to Union Carbide and Carbon Corporation, a corporation of New York No Drawing. Application October 26, 1934, Serial No. 750,132

16 Claims. (Cl. 260—106)

The invention relates to a process for the preparation of esters, especially organic esters derived by the substitution of an alkyl group for the carboxyl hydrogen of an aliphatic organic acid.

Many processes have been proposed for preparing these esters, the most common of which employ the well known reaction between an alcohol and an organic acid, or its anhydride. Since this type of reaction is a reversible one, efficient conversion to the ester is promoted by removing the water formed as the reaction proceeds. Improvements in the art have been directed largely to this phase of the process, as well as to the use of various forms and kinds of catalyst materials. It is generally considered, however, that an alcohol constitutes the most economical, and the most suitable, reacting ingredient for the preparation of esters, and little knowledge is available showing the formation of these compounds with other than an alcohol as one of the essential reactants.

In accordance with our invention, an ether is used as a starting product, and we have found that under properly controlled reacting conditions, an ether will react with organic acids, or their anhydrides, in the presence of an esterification catalyst, preferably sulfuric acid or other strong non-volatile acid, to produce good ester yields. The process is entirely feasible for commercial production of organic esters, and is particularly economical where ethers may be readily available, for example as by-products in synthetic alcohol manufacture.

The reaction involved in this process is a simple one, although quite unexpected in view of known information as to the nature of ethers. These compounds are generally considered to be of very stable character, and differ from alcohols in many respects as to their chemical activity. In fact, ethers are often distinguished from alcohols as compounds which will not react with acids to form esters. The problem of water removal during the esterification is entirely eliminated when an ether is reacted with an organic acid anhydride; and when an acid is used, the amount of water formed is only half of that liberated in the usual alcohol and acid reaction. This is evident from the following representative reactions, showing the preparation of isopropyl acetate by the action of acetic anhydride on diisopropyl ether, acetic acid on diisopropyl ether; and acetic acid on isopropyl alcohol:

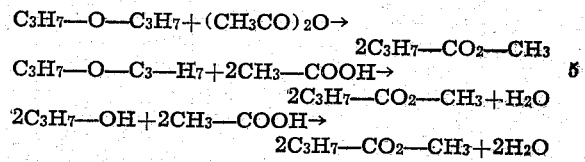

The following examples are illustrative of certain embodiments of our process:

Example 1

Acetic anhydride and diisopropyl ether, in the amounts respectively of 3000 c. c. and 950 c. c., were mixed in a round-bottom flask. To this was added 13 c. c. of concentrated sulfuric acid as a catalyst. The entire mixture was brought to boiling, and the vapors passed through a four-foot bead-packed column to a condenser. The condensate was returned to the kettle. After the vapor temperature reached 86° C., which required from 6 to 15 hours, isopropyl acetate was distilled off until the vapor temperature reached 88° C. Then a fresh charge of diisopropyl ether and an equivalent quantity of acetic anhydride (635 c. c.), together with a small additional amount of sulfuric acid, was added to the kettle, and the process repeated. This cycle was continued until four charges of ether had been reacted. The ester contained in the distillate then corresponded to an overall yield of 75%, based on the amount of ether charged. By a redistillation, isopropyl acetate of commercially pure quality was obtained.

Example 2

Three liters of glacial acetic acid, 786 c. c. of diisopropyl ether, and 40 c. c. of concentrated sulfuric acid, as a catalyst, were mixed in a round-bottomed flask. The mixture was brought to boiling, and the vapors passed through a condenser arranged so that the condensate was refluxed back into the liquid in the kettle. After reacting for 18 hours, the mixture was distilled through a fractionating column whereby most of the isopropyl acetate was recovered in the distillate, and most of the unreacted acetic acid remained in the kettle. The small amount of isopropyl acetate remaining in the kettle, as determined by analysis, added to the amount contained in the distillate corresponded to a yield of 49.8% of ester, based on the diisopropyl ether charged. The unused acetic acid in the kettle could be reacted with additional charges of ether if desired.

*Example 3*

In a manner substantially similar to the above, normal dibutyl ether was reacted with both acetic anhydride and glacial acetic acid. Due to the higher boiling temperature of the butyl ether and the butyl acetate ester, correspondingly higher temperatures were used in these two reactions. Certain difficulties were encountered in completely separating the butyl acetate by distillation from the reaction mixture, as the ester tended to concentrate in the kettle, due to the formation of a low-boiling azeotropic mixture which was rich in ether and anhydride or acid. The yield of butyl acetate in both of these reactions was lower than in the above isopropyl acetate reactions, but was sufficient to clearly indicate the practicability of the reaction. It was also apparent that a more complete separation of the ester product, with improved yields, might be effected by variation in the proportion of reacting ingredients.

In adapting the process to commercial procedure, modifications in the reaction conditions shown by the examples may be advisable to increase efficiency, and these will vary to a certain extent depending upon the particular ester being prepared. As a starting material the organic acid is usually a cheaper source of supply than its anhydride, and is preferred for that reason. The essential factors affecting the extent of conversion, and the corresponding efficiency of the reaction, are the temperature, the relative proportions of the reacting materials, and the concentration of the acid catalyst. Very small amounts of sulfuric acid will noticeably promote the reaction, but its presence in at least about 2% by weight of the reaction mixture is preferred. At the same time higher than about 4% acid should be avoided, as there is a tendency toward undesirable side reactions with a catalyst concentration higher than this. Phosphoric acid, toluene sulfonic acid, or other strong acid which is non-volatile at the temperature of the reaction may also serve as a suitable catalyst. It is desirable in the initial charge to employ an excess of the organic acid over that theoretically required to completely react with all of the ether. An initial gram molecular ratio—acid to ether—of 3:1 has been found to give very good yields of ester, although higher proportions of acid may be suitable under certain conditions. Numerous tests give indication that the conversion of the ether to ester increases with temperature. At atmospheric pressure the temperature required for reflux will vary with the boiling point of the particular reaction mixture being processed, and this will, of course, control to a certain extent the most desirable operating temperature for any particular reaction. However, the use of superatmospheric pressure, and temperatures higher than the normal boiling point will promote efficiency. In the isopropyl acetate reaction, for example, the most suitable conversion temperature is about 120° C., at which point the vapor pressure of the liquid charge is about 30 pounds per square inch gauge.

It will be understood that the process of this invention is applicable to the preparation of organic esters other than those of acetic acid, as shown by illustrative examples, and that aliphatic ethers generally will react with organic acids in the manner described. In the appended claims the term "acid", as used therein to indicate the organic acid reactant, is intended to include also the corresponding acid anhydride, and the invention should not be limited other than as defined by these claims.

We claim:

1. The process of preparing organic esters which comprises reacting an unsubstituted lower dialkyl ether with an aliphatic lower monocarboxylic acid, in the presence of catalytic proportions of a strong non-volatile acid.

2. The process of preparing organic esters which comprises reacting an unsubstituted lower dialkyl ether with a lower saturated fatty acid, in the presence of catalytic proportions of sulfuric acid.

3. The process of preparing organic esters which comprises reacting an unsubstituted lower dialkyl ether with a lower saturated fatty acid, in the presence of about 2% to about 4% by weight of sulfuric acid.

4. The process of preparing organic esters which comprises reacting an unsubstituted lower dialkyl ether with an excess of a lower saturated fatty acid, in the presence of about 2% to about 4% by weight of sulfuric acid.

5. The process of preparing organic esters which comprises mixing an unsubstituted lower dialkyl ether with a lower saturated fatty acid, heating said mixture under superatmospheric pressure at a temperature higher than its normal boiling point, and in the presence of an esterification catalyst, and isolating the ester from the reaction product.

6. The process of preparing organic esters which comprises mixing an unsubstituted lower dialkyl ether with an excess of a lower saturated fatty acid, heating said mixture under superatmospheric pressure at a temperature higher than its normal boiling point, and in the presence of catalytic proportions of a strong non-volatile acid, and isolating the ester from the reaction product.

7. The process of preparing organic esters which comprises mixing an unsubstituted lower dialkyl ether with an excess of a lower saturated fatty acid, heating said mixture under superatmospheric pressure at a temperature higher than its normal boiling point, and in the presence of about 2% to about 4% by weight of sulfuric acid, and isolating the ester from the reaction product.

8. The process of preparing isopropyl acetate which comprises reacting diisopropyl ether with acetic acid, in the presence of catalytic proportions of sulfuric acid.

9. The process of preparing isopropyl acetate which comprises reacting diisopropyl ether with acetic acid, in the presence of about 2% to about 4% by weight of sulfuric acid.

10. The process of preparing isopropyl acetate which comprises mixing diisopropyl ether with an excess of acetic acid, heating said mixture under superatmospheric pressure at a temperature higher than its normal boiling point, and in the presence of an esterification catalyst, and isolating isopropyl acetate from the reaction product.

11. The process of preparing isopropyl acetate which comprises mixing diisopropyl ether with an excess of glacial acetic acid, heating said mixture at a temperature higher than about 110°

C., in the presence of an esterification catalyst, and isolating isopropyl acetate from the reaction product.

12. The process of preparing isopropyl acetate which comprises mixing diisopropyl ether and glacial acetic acid in the proportion of about three mols of acid to one mol. of ether, heating said mixture at a temperature of about 120° C., in the presence of about 2% sulfuric acid, and isolating isopropyl acetate from the reaction product.

13. The process of preparing normal butyl acetate which comprises reacting normal dibutyl ether with acetic acid, in the presence of catalytic proportions of sulfuric acid.

14. The process of preparing normal butyl acetate which comprises reacting normal dibutyl ether with acetic acid, in the presence of about 2% to about 4% by weight of sulfuric acid.

15. The process of preparing normal butyl acetate which comprises mixing normal dibutyl ether with an excess of acetic acid, heating said mixture under superatmospheric pressure at a temperature higher than its normal boiling point, and in the presence of an esterification catalyst, and isolating normal butyl acetate from the reaction product.

16. The process of preparing normal butyl acetate which comprises mixing normal dibutyl ether with an excess of glacial acetic acid, heating said mixture under superatmospheric pressure at a temperature higher than its normal boiling point, and in the presence of about 2% to about 4% of sulfuric acid, and isolating butyl acetate from the reaction product.

HENRY L. COX.
PAUL S. GREER.